US007932907B2

(12) United States Patent
Nachmanson et al.

(10) Patent No.: US 7,932,907 B2
(45) Date of Patent: Apr. 26, 2011

(54) LAYERED GRAPH LAYOUTS WITH A GIVEN ASPECT RATIO

(75) Inventors: Lev Nachmanson, Redmond, WA (US);
George Robertson, Seattle, WA (US);
Bongshin Lee, Issaquah, WA (US)

(73) Assignee: Microsoft Corp., Redmond, WA (US)

( * ) Notice: Subject to any disclaimer, the term of this patent is extended or adjusted under 35 U.S.C. 154(b) by 891 days.

(21) Appl. No.: 11/751,610

(22) Filed: May 21, 2007

(65) Prior Publication Data
US 2008/0291203 A1 Nov. 27, 2008

(51) Int. Cl.
*G09G 5/00* (2006.01)
*G06F 17/00* (2006.01)
*G06F 3/048* (2006.01)

(52) U.S. Cl. ......... 345/440; 715/243; 715/853; 345/619

(58) Field of Classification Search .................. 345/440, 345/619; 715/235, 243, 853
See application file for complete search history.

(56) References Cited

U.S. PATENT DOCUMENTS

| 5,467,472 | A  |   | 11/1995 | Williams et al. |         |
|-----------|----|---|---------|-----------------|---------|
| 5,887,174 | A  | * | 3/1999  | Simons et al.   | 717/161 |
| 6,035,061 | A  |   | 3/2000  | Katsuyama et al.|         |
| 6,057,842 | A  |   | 5/2000  | Knowlton et al. |         |
| 6,128,023 | A  |   | 10/2000 | Kawashima       |         |
| 6,490,604 | B1 |   | 12/2002 | Toyosawa et al. |         |
| 6,826,727 | B1 |   | 11/2004 | Mohr et al.     |         |
| 6,847,979 | B2 | * | 1/2005  | Allemang et al. | 345/440 |
| 7,027,052 | B1 | * | 4/2006  | Thorn et al.    | 345/440 |
| 7,035,463 | B1 |   | 4/2006  | Monobe et al.   |         |
| 7,363,583 | B1 | * | 4/2008  | Costa           | 715/734 |
| 7,593,012 | B2 | * | 9/2009  | Ikehata et al.  | 345/440 |
| 2005/0094206 | A1 |   | 5/2005  | Tonisson      |         |
| 2005/0094207 | A1 |   | 5/2005  | Lo et al.     |         |
| 2005/0273730 | A1 | * | 12/2005 | Card et al.   | 715/853 |
| 2006/0294460 | A1 |   | 12/2006 | Chao et al.   |         |

OTHER PUBLICATIONS

Gansner, E. et al., "Drawing graphs with dot", p. 1-40, Jan. 26, 2006.*
Barth, W., M. Jünger, and P. Mutzel, 2002, Simple and efficient bilayer cross counting, Proc. 10th Int. Symposium of Graph Drawing, Lecture Notes in Computer Science 2528, pp. 130-141.
Brandes, U., and B. Köpf, Fast and simple horizontal coordinate assignment, Lecture Notes in Computer Science, Revised Papers from the 9th International Symposium on Graph Drawing, 2001, Springer-Verlag, pp. 31-44, vol. 2265.
Coffman E.G. Jr. and R.L. Graham, Optimal scheduling for two processor systems, Acta Informatica, 1972, pp. 200-213, vol. 1.
Duncan, C. A., M. T. Goodrich, and S. Kobourov, Balanced aspect ratio trees and their use for drawing very large graphs, Proceedings of the 6th Symposium on Graph Drawing, 1998, pp. 111-24, Springer-Verlag.

(Continued)

*Primary Examiner* — Chante Harrison
(74) *Attorney, Agent, or Firm* — Lyon & Harr, LLP; Katrina A. Lyon

(57) ABSTRACT

A graph layout technique that creates a layered graph layout with a given aspect ratio. The present layered graph layout technique better utilizes the available space and, at the same time, creates an aesthetically pleasing drawing of a directed graph. In one embodiment it determines the layout of the new graph based on a modified Sugiyama technique combined with a modified Coffman-Graham scheduling algorithm. Given a directed graph and a desired aspect ratio, it uses a binary search and the Coffman-Graham scheduling algorithm to find a layout of the graph that has an aspect ratio that matches the given aspect ratio of the available space.

17 Claims, 9 Drawing Sheets

OTHER PUBLICATIONS

Eiglsperger, M., M. Siebenhaller, M. Kaufmann An efficient implementation of Sugiyama's algorithm for layered graph drawing, J. of Graph Algorithms and Applications, 2005, pp. 155-166, vol. 9, No. 3.

Gansner, E. R., E. Koutsofios, S.C. North, and K. P. Vo, A technique for drawing directed graphs, IEEE Trans. Soft. Eng., 1993, pp. 214-230, vol. 19.

Glee: Graph Layout Engine, available at http://research.microsoft.com/~levnach/GLEEWebPage.htm.

Graphviz todo list Dec. 22, 2005, available at http://www.graphviz.org/doc/todo.html.

Katreniakova, J., Presentation of the content structurefor e-learning, written part of dissertation exam, Project of Dissertation Thesis, 2006, Bratislava.

Lutterkort, D., and J. Peters, Smooth paths in a polygonal channel, Proc. of the 15th Annual Symposium on Computational Geometry, 1999, pp. 316-321.

Myles, A., and J. Peters, Threading splines through 3D channels, Computer Aided Design, Feb. 2005, pp. 139-148, vol. 37, No. 2.

Nikolov, N. S., A. Tarassov, Graph layering by promotion of nodes, Discrete Applied Mathematics, Apr. 2006, vol. 154, No. 5, pp. 848-860.

Rowe, L. A., M. Davis, E. Messinger, C. Meyer, C. Spirakis, and A. Tuan, A browser for directed graphs, Software—Practice and Experience, 1987, vol. 17, No. 1, pp. 61-76.

Stedile, A., JMFGraph—A modular framework for drawing graphs in java, Master's Thesis, Graz Univ. of Tech., Institute for Info. Processing and Comp. Supported New Media (IICM), Nov. 18, 2001, Graz, Austria.

* cited by examiner

GRAPH G(V,E) where the set of vertices or nodes is V={a, b, c, d, e} and the set of edges or links is E={ (a,b), (b,c), (b,d), (b,e)}

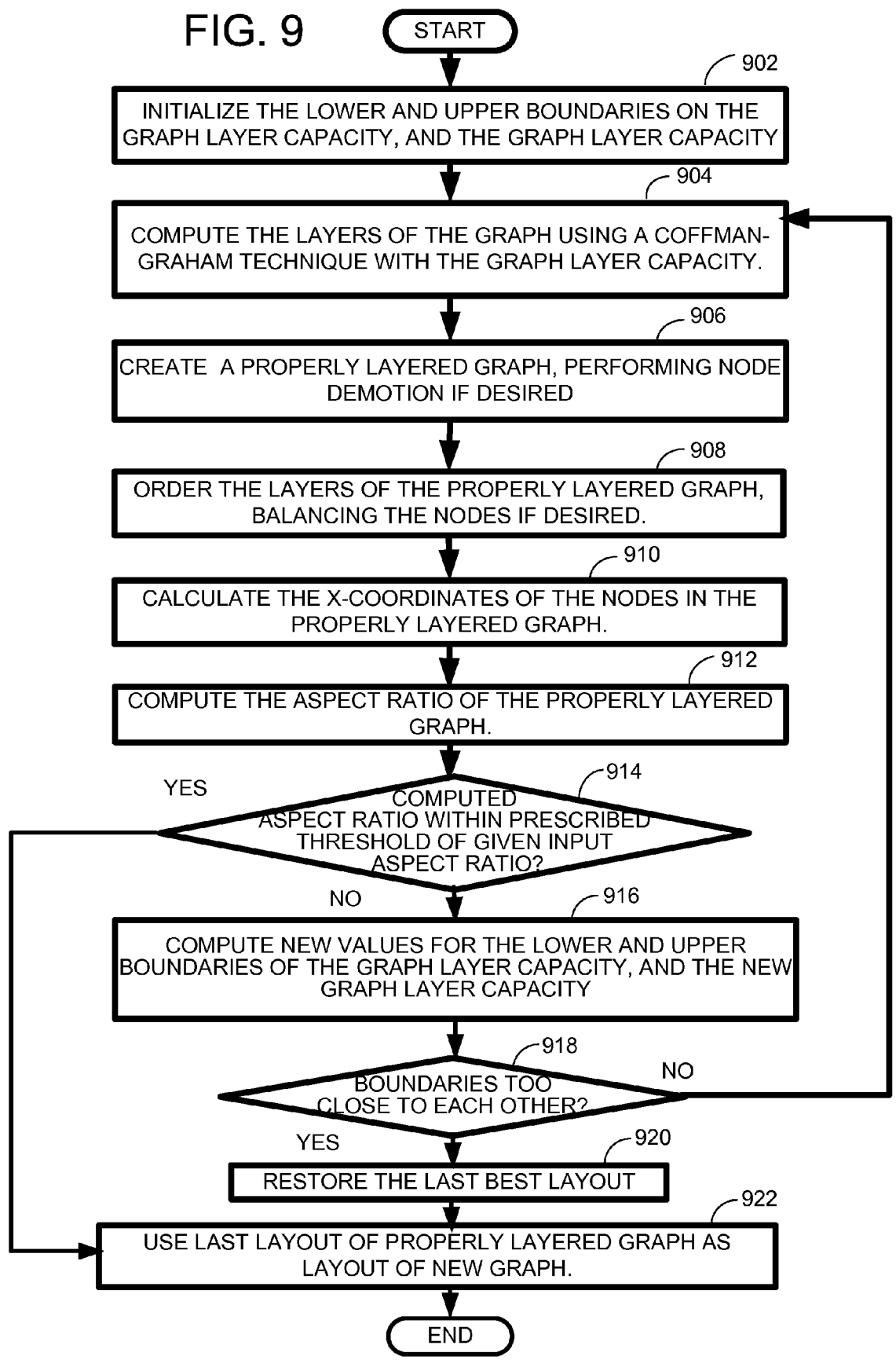

LAYERED GRAPH LAYOUTS WITH A GIVEN ASPECT RATIO

BACKGROUND

Layout of documents, in particular electronic documents, can be problematic. For example, the inability to adapt document layouts to different display sizes is becoming a more and more critical problem, as the variety of new and differently sized display devices proliferates. The problem is also exacerbated, in a sense, by the rapidly increasing screen resolutions available on LCD displays. These displays make practical increasingly complex page layouts and graphical designs that come closer all the time to rivaling those that can be rendered on the printed page.

Good automatic layout is fundamentally hard. The problem is compounded for more complex layouts, such as, for example, directed graphs. Typically the layout designer is given a rectangular area with a specific aspect ratio to place such a graph, but if the typical graph is merely scaled in size to fit the area, it will likely be quite hard to read and there may be much white space around the nodes of the graph.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present layered graph layout technique creates a layered graph layout for a directed graph with a given aspect ratio of the available space. The present layered graph layout technique better utilizes the available space and, at the same time, creates an aesthetically pleasing drawing of the directed graph. In one embodiment, it determines the layout of a graph based on a modified Sugiyama technique combined with a modified Coffman-Graham scheduling algorithm. Given a directed graph and a desired aspect ratio, it uses a binary search and the Coffman-Graham scheduling algorithm to find a layout of the graph that has an aspect ratio that matches the given aspect ratio of the available space.

It is noted that while the foregoing limitations in existing techniques laying out documents, in particular directed graphs, described in the Background section can be resolved by a particular implementation of the layered graph layout technique described, this technique is in no way limited to implementations that just solve any or all of the noted disadvantages. Rather, the present technique has a much wider application as will become evident from the descriptions to follow.

DESCRIPTION OF THE DRAWINGS

The specific features, aspects, and advantages of the claimed subject matter will become better understood with regard to the following description, appended claims, and accompanying drawings where:

FIG. 9 depicts an example of using a modified Coffman-Graham scheduling program in determining the layout of a directed acyclic graph.

DETAILED DESCRIPTION

In the following description, reference is made to the accompanying drawings that form a part hereof, and in which is shown by way of illustration specific embodiments in which the present technique may be practiced. It is understood that other embodiments may be utilized and structural changes may be made without departing from the scope of the present disclosure.

1 The Computing Environment

Before providing a description of embodiments of the present layered graph layout technique, a brief, general description of a suitable computing environment in which portions of the technique may be implemented will be described. The technique is operational with numerous general purpose or special purpose computing system environments or configurations. Examples of well known computing systems, environments, and/or configurations that may be suitable for use with the process include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
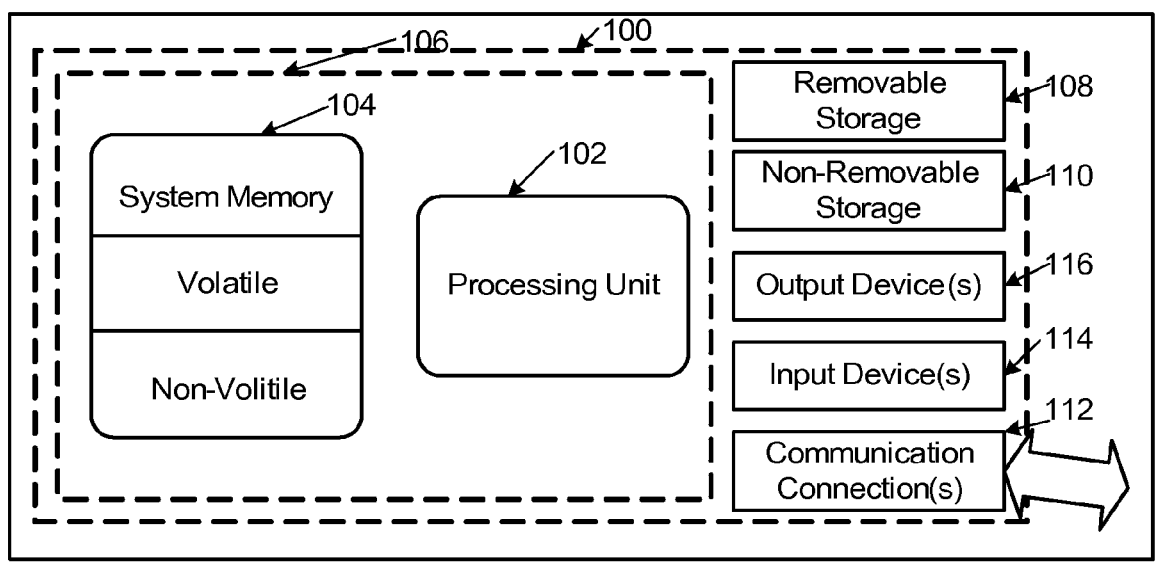
FIG. 1 is a diagram depicting a general purpose computing device constituting an exemplary system for implementing the present layered graph layout technique.

FIG. 1 illustrates an example of a suitable computing system environment. The computing system environment is only one example of a suitable computing environment and is not intended to suggest any limitation as to the scope of use or functionality of the present system and process. Neither should the computing environment be interpreted as having any dependency or requirement relating to any one or combination of components illustrated in the exemplary operating environment. With reference to FIG. 1, an exemplary system for implementing the present process includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have other input device(s) 114 such as keyboard, mouse, pen, voice input device, camera, microphone, touch input device, etc. Output device(s) 116 such as a display, speakers, printer, etc. may also be included. All these devices are well known in the art and need not be discussed at length here.

The present technique may be described in the general context of computer-executable instructions, such as program modules, being executed by a computing device. Generally, program modules include routines, programs, objects, components, data structures, and so on that perform particular tasks or implement particular abstract data types. The process may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present layered graph layout technique.

2 Layered Graph Layout Technique

Figure 2:
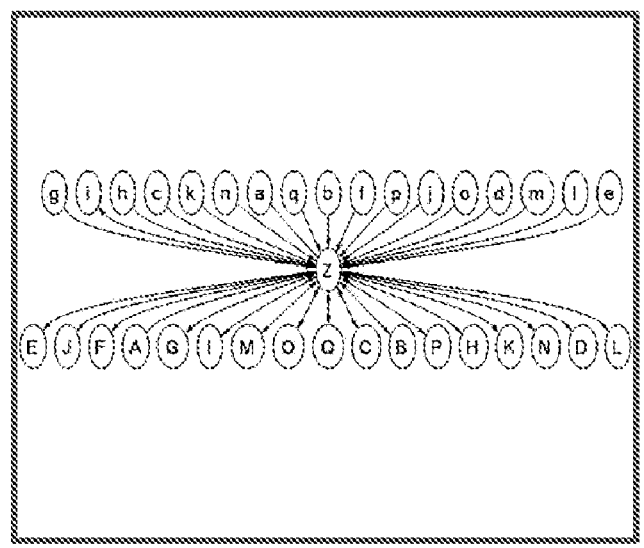
FIG. 2 is an example of a layout of a directed graph created by the default application of the Sugiyama's scheme.
Figure 3:
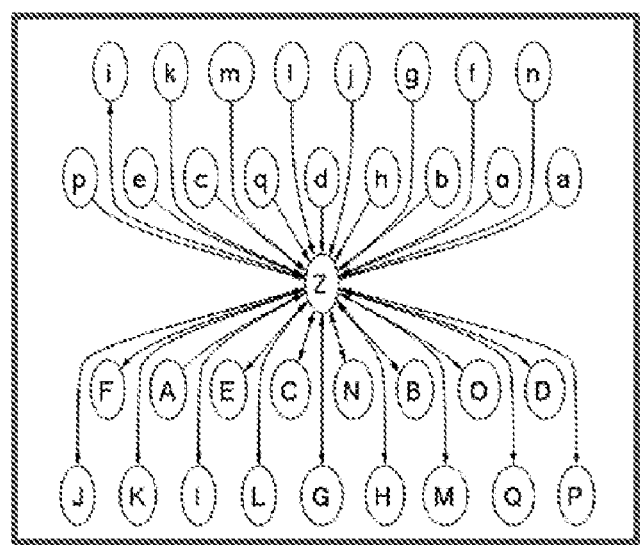
FIG. 3 is an exemplary layout of the directed graph in FIG. 2 improved by the present layered graph layout technique.

When formatting a document containing a graph, it is desirable to fully utilize the available space and, at the same time, create an aesthetically pleasing drawing of the graph. Typically a rectangle defines the given available space for laying out such a graph. As seen in FIGS. 2 and 3, the same graph can be drawn differently in the given rectangle. It is evident that FIG. 3, which was generated using the present layered graph layout technique, better utilizes the available space than FIG. 2, and hence has less white space around the nodes of the graph. The nodes in FIG. 3 are larger than the nodes in FIG. 2 which increases the readability of the drawing.

In general, the present layered graph layout technique is a method of creating a layered graph layout with a given aspect ratio. The present layered graph layout technique better utilizes the available space and, at the same time, creates an aesthetically pleasing drawing of a directed graph. In one embodiment it determines the layout of the new graph based on a modified Sugiyama technique combined with a modified Coffman-Graham scheduling algorithm. It uses a binary search to find a layout of the graph.

The following sections provide some background and context regarding the present layered graph layout technique, a description of an exemplary architecture, and a process employing the present layered graph layout technique. Finally, additional heuristics that can be employed to improve the new layout are also described.

2.1 Context

The following paragraphs provide some background information and insight into some aspects and known procedures employed in the present layered graph layout technique.

2.1.1 Review of a Directed Graph

The present layered graph layout technique is applicable to the layout of directed graphs. A directed graph G is a pair (V,E) where V is a set of vertices or nodes and E is the set of edges, that are couples (u,w) with u and w from V. Typically, a graph is depicted in diagrammatic form as a set of shapes representing nodes joined by curves representing edges.

Figure 4:
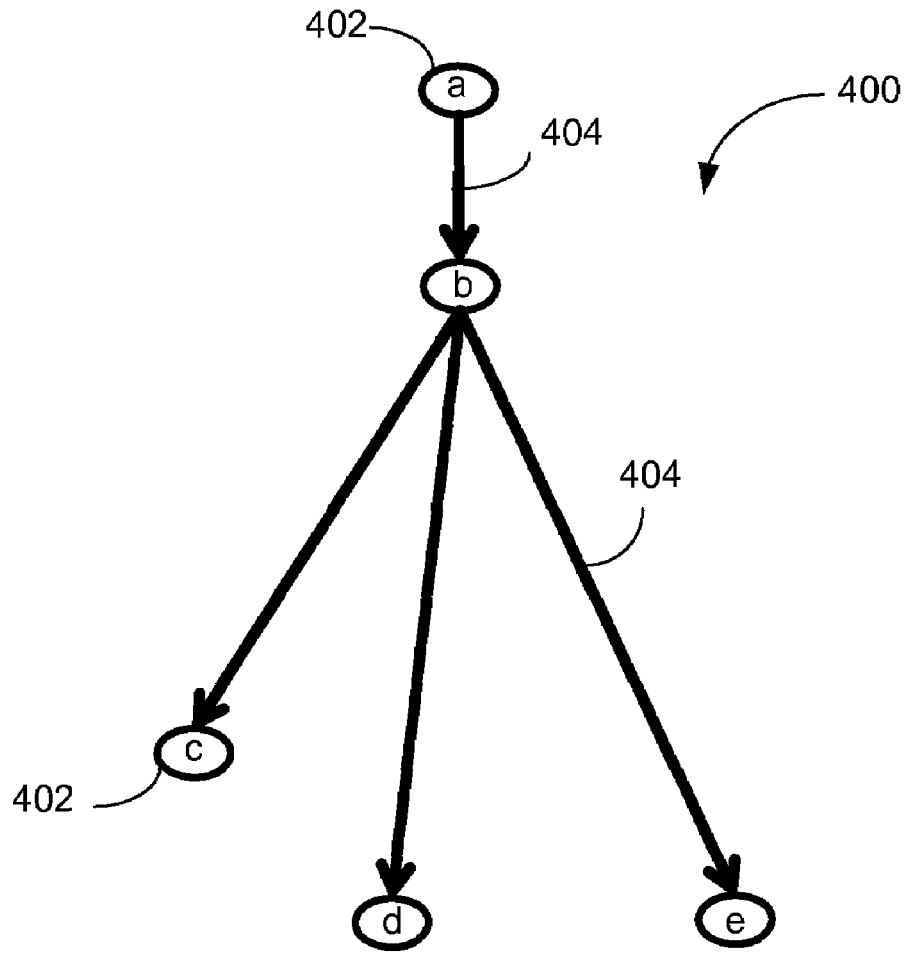
FIG. 4 depicts the nodes and edges of a directed acyclic graph G(V,E) where the set of vertices or nodes is V={a, b, c, d, e} and the set of edges or links is E={(a,b), (b,c), (b,d), (b,e)}.

A directed acyclic graph, also called a DAG, is a directed graph with no cycles; that is, for any vertex v, there is no directed path that starts and ends on v. FIG. 4 provides an example of a directed acyclic graph 400. FIG. 4 depicts graph 400 in the form of G(V,E) where the nodes or vertices, V, are $\{a, b, c, d, e\}$ and the edges, E, are $\{(a,b), (b,c), (b,d), (b,e)\}$.

2.1.2 Review of Sugiyama's Graph Layout Scheme

Since Sugiyama's scheme is employed in the present layered graph layout technique, as it is in many other layout techniques, the following paragraphs review the most pertinent aspects of Sugiyama's scheme. Since Sugiyama's technique is well known, it will not be reviewed in depth here.

In general, Sugiyama's scheme produces layered graph layouts. It generally consists of four phases: In the first phase, called Cycle Removal, an input graph G=(V,E) is made acyclic by reversing appropriate edges. During the second phase, called Layer Assignment, the vertices are assigned to horizontal layers. Before the third phase starts, long edges between vertices of non-adjacent layers are replaced by chains of edges between the corresponding adjacent layers, new introduced vertices at this step are called virtual vertices. In the third phase, called Crossing Reduction, an ordering of the vertices within a layer is computed such that the number of edge crossings is reduced. This is commonly done by a layer-by-layer sweep where in each step the number of edge crossings is minimized for a pair of adjacent layers. The fourth phase, called Horizontal Coordinate Assignment, calculates an x-coordinate for each vertex. Finally for each edge a curve connecting the edge node start shape and the edge node end shape is created.

Figure 5:
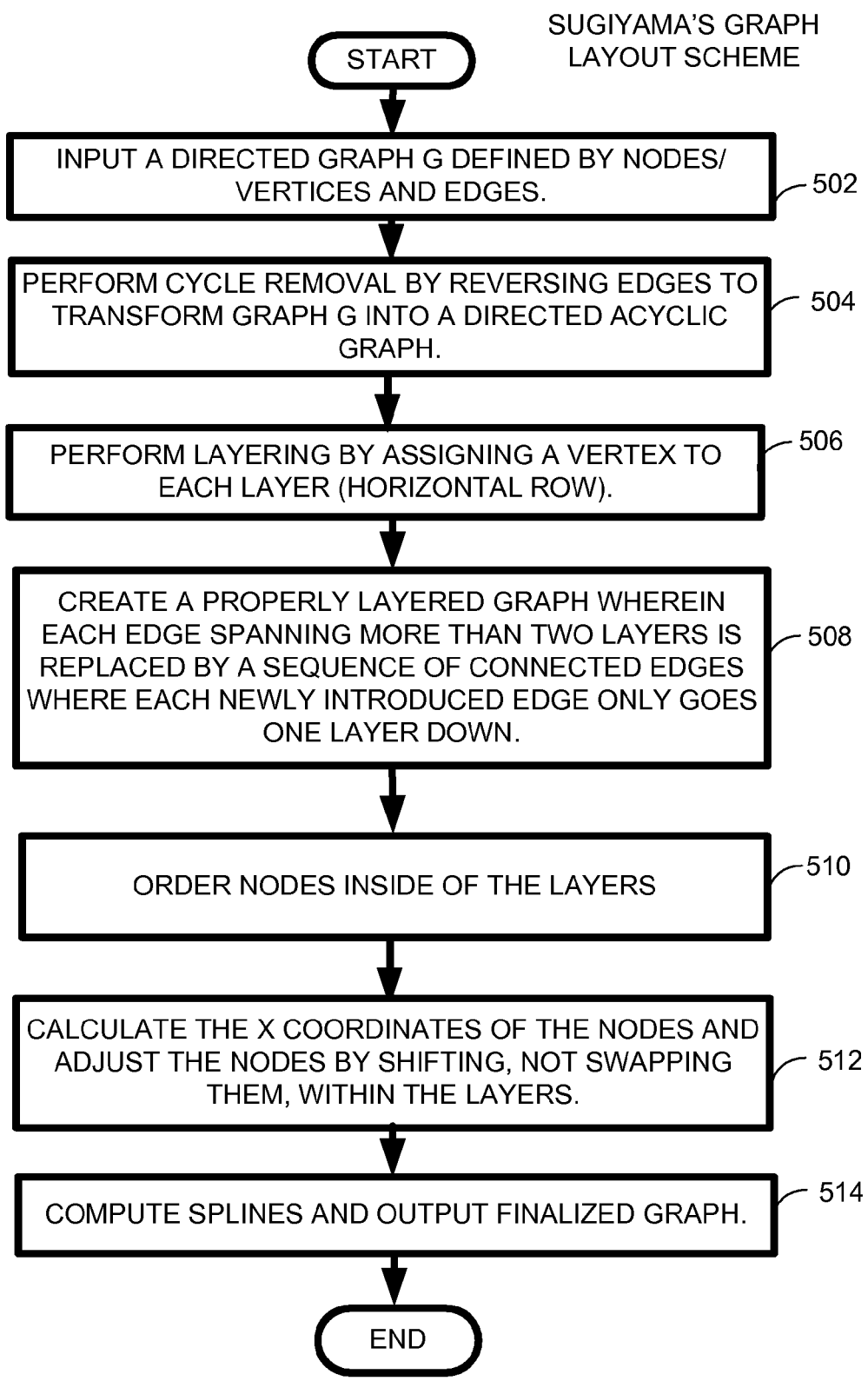
FIG. 5 depicts a general flow diagram of Sugiyama's graph layout scheme.

More specifically, for each node of input graph G a boundary curve is defined, so that the width and the height of each node from the curve bounding box are known. Lower bounds on the distance between two nodes and the distance between two layers are given. A real valued function Weight is defined on the edges. The greater the Weight(e) is for edge e, the more important it is to keep the edge short. By default Weight is 1 everywhere. A function called Separation with values in the set of natural numbers is defined on edges of G and used to keep an edge from being too short or too flat. By default Separation is 1 everywhere also. FIG. 5 shows the steps of Sugiyama's scheme:

1) Initially, cycle removal is performed (boxes 502, 504). This is done by transforming graph G into a DAG, directed acyclic graph, by reversing some edges and thus breaking the cycles.

2) Next, layering is performed by assigning each vertex to a layer, a horizontal row (box 506). Let l be the layering function. The layering corresponding to l is valid if for each edge (u, v) from G holds $$l(u) \geq l(v) + \text{Separation}(u,v) \tag{1}$$

Figure 6:
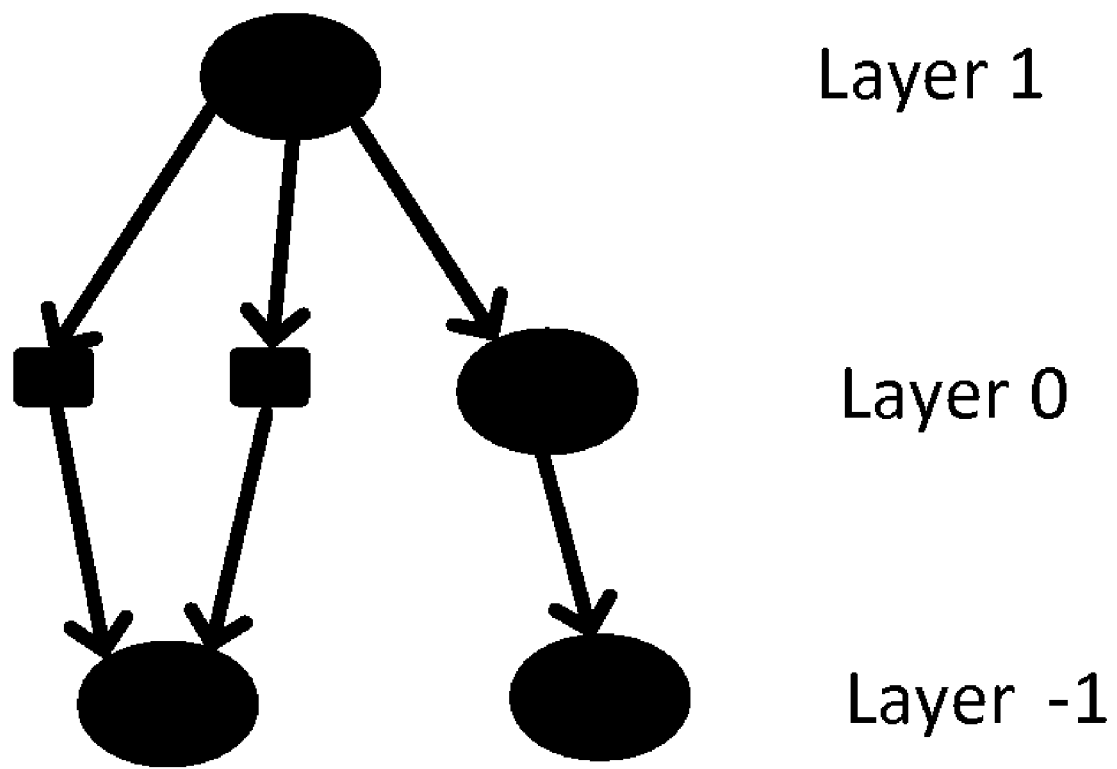
FIG. 6 depicts an example of a properly layered graph.

At this point a proper layered graph is created (box 508). A proper layered graph is such that each edge connects nodes on adjacent layers. In creating a proper layered graph, each edge spanning more than two layers is replaced by a sequence of connected edges, where each newly introduced edge goes only one layer down, as shown at FIG. 6. In this manner, the DAG is modified into a proper layered DAG. The new vertices are called virtual vertices.

3) Next, the vertices are ordered inside of the layers. The order of vertices inside of the layers is defined so as to reduce the number of edge crossings (box 510).

4) Next, the x-coordinates of the nodes are calculated (box 512). The x-coordinates of the nodes are also adjusted by shifting, but not swapping, them within the layers.

5) Finally, spline routing is performed (box 514). For each edge a spline is created and trimmed with the source and target node boundaries, and the positions of the arrow heads are calculated.

The present layered graph layout technique employs some of the features of Sugiyama's graph layout scheme as will be evident in the following description of the technique.

2.3 Exemplary Layered Graph Layout System

Figure 7:
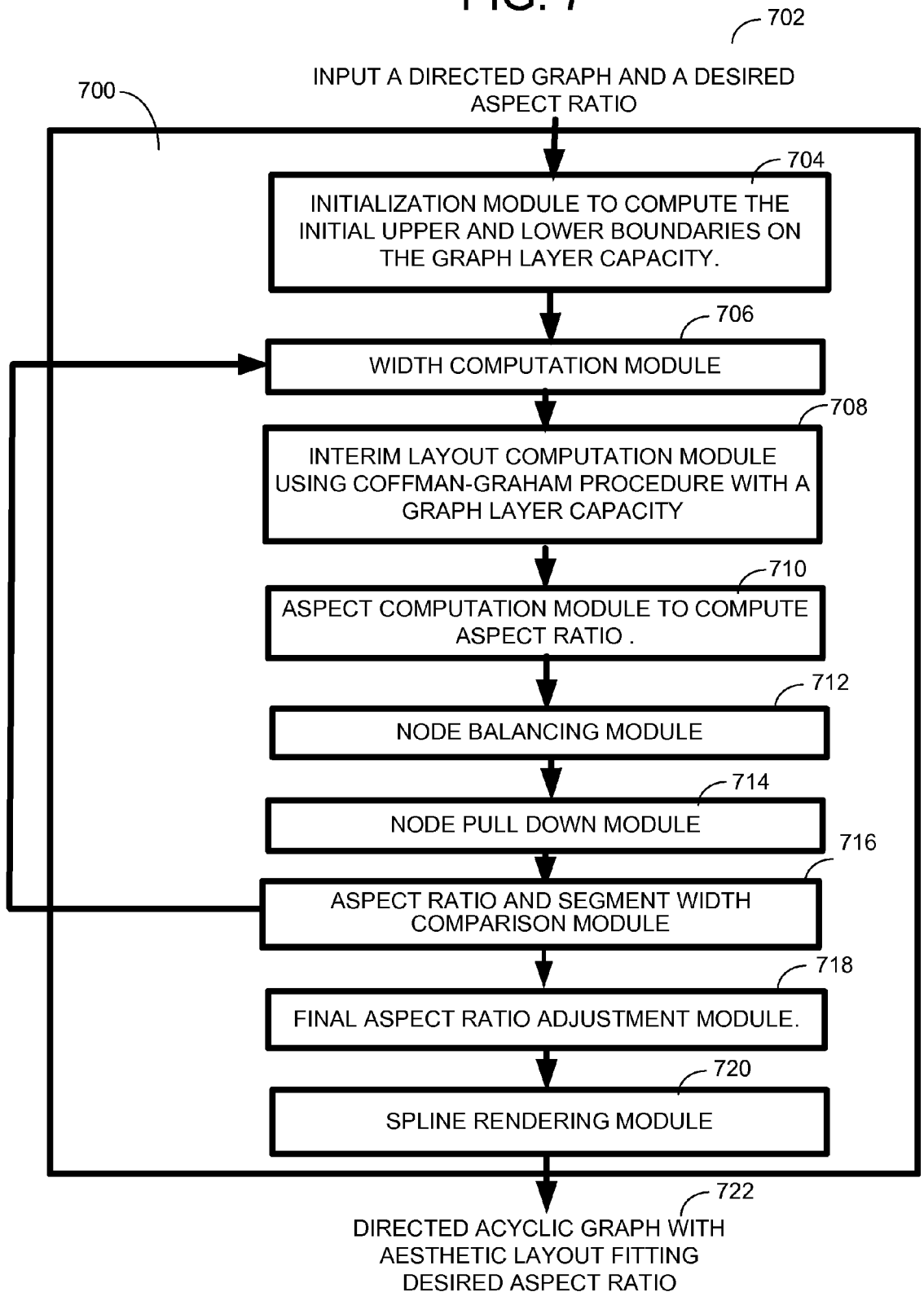
FIG. 7 is a block diagram depicting the architecture of one embodiment of the present layered graph layout technique described herein.

FIG. 7 provides an example of an exemplary architecture that can be employed with the present layered graph layout technique, which typically resides as a module 700 on an exemplary computing device 100 discussed in the exemplary operating environment discussed above.

This exemplary architecture of the layered graph layout technique includes an initialization module 704 in which a given directed graph and a desired aspect ratio 702 are input. The initialization module 704 is also responsible for determining the initial minimum and maximum boundaries on the bound of the sum of the node widths in a layer. The exemplary architecture of the layered graph layout technique also has a bound of the sum of the node widths for a layer determining module 706. An interim layout determination module 708 determines an interim layout of the new graph. The interim layout is determined using a modified version of the well known Coffman-Graham scheduling process which limits the node widths in a layer. Once the interim layout us determined, the aspect ratio computation module 710 determines a computed aspect ratio using the width and height of the interim layout and this is compared to the given desired aspect ratio in the aspect ratio comparison module 716. If the computed aspect ratio is close enough to the desired aspect ratio, the layered graph layout technique uses the interim layout as the parameters for the new graph. It also optionally balances the virtual and original nodes inside of the layers so that they are visually pleasing in the node balancing module 712, adjusts the lengths of the edges in the edge adjustment or node pull down module 714, and adjusts the overall height and width of the new graph so that it more precisely matches the given aspect ratio in the aspect ratio adjustment module 718. If the computed aspect ratio is not close enough to the desired aspect ratio, a new width is determined, as are new boundaries on the width, and the technique iteratively recomputes the corresponding layout until the computed aspect ratio is close enough to the desired aspect ratio or the lower and upper boundaries are too close to each other to perform any further iterations. Finally, a spline module 720 calculates the splines between the nodes and a new layout for the directed acyclic graph that fits the desired aspect ratio is output 722.

2.4 Exemplary Processes Employing the Layered Graph Layout Technique

Figure 8:
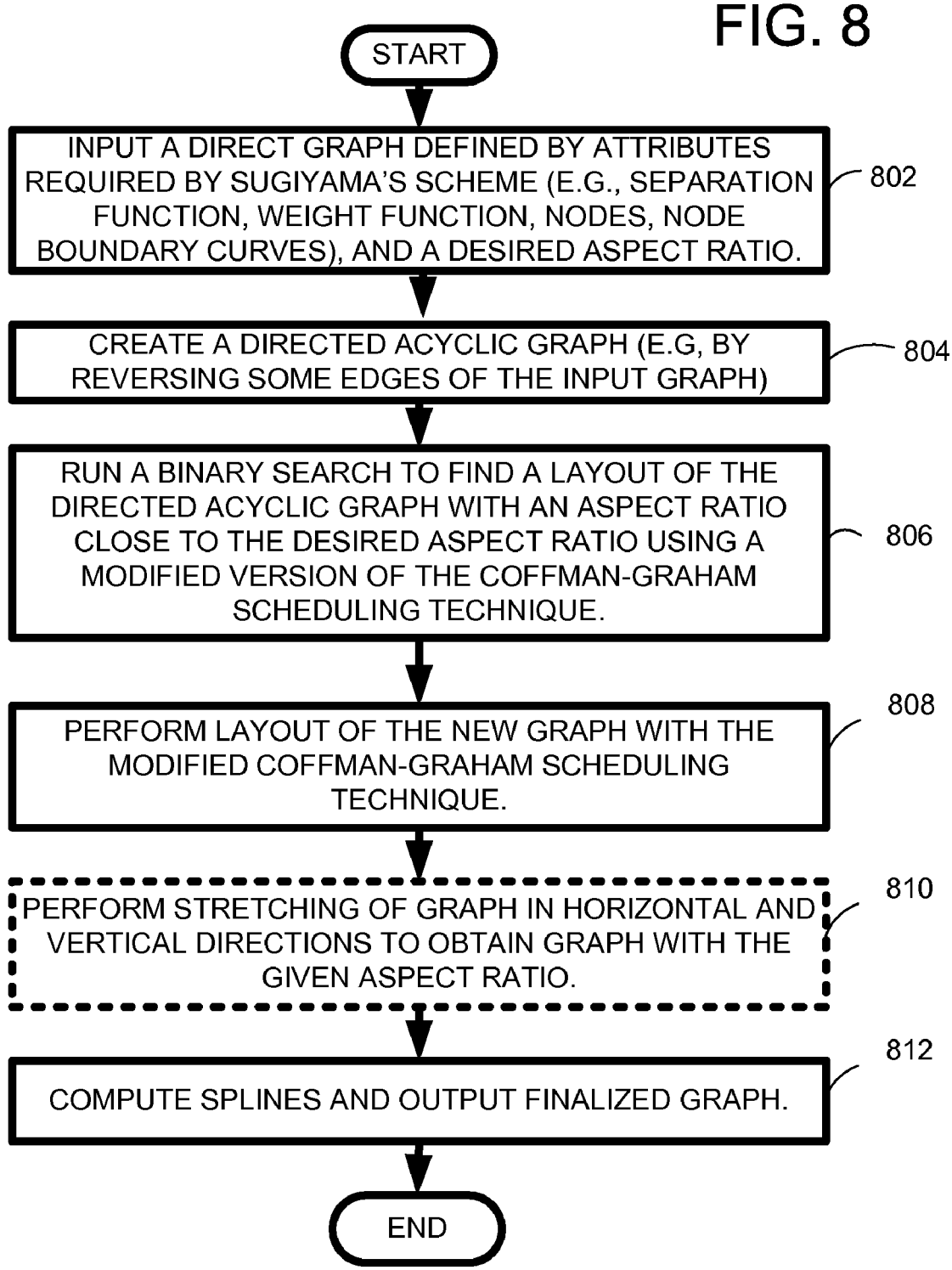
FIG. 8 is a general exemplary flow diagram of a process employed by one embodiment of the present layered graph layout technique.

FIG. 8 provides an overview of one embodiment of the present layered graph layout technique.

As shown in FIG. 8, box 802, a directed graph with all attributes that are required by the Sugiyama's scheme (e.g., the separation function, the weight function, the nodes and the node boundary curves) and, in addition, a number representing the desired or given aspect ratio are input. The present layered graph technique then converts the directed graph into a directed acyclic graph (DAG) by reversing some edges of the graph, if the input graph is not already a directed acyclic graph (box 804). A binary search is then performed to find a layout of the directed acyclic graph with an aspect ratio that matches the desired aspect ratio using a modified version of the Coffman-Graham algorithm (box 806). This binary search is described in more detail in the paragraph below. After the binary search finds the layout corresponding to the desired aspect ratio, the layout of a new graph is performed using this layout (box 808). The present layered graph layout technique can optionally then fine tune the new layout by stretching the new graph layout in the horizontal or the vertical directions to obtain a layout with the aspect ratio equal to the given or desired one (box 810). Finally, splines between the nodes of the new graph are computed and the finalized new graph matching the desired aspect ratio is output (box 812).

As discussed above, the target of the binary search is the graph layer capacity playing the role of the number of processors in the Coffman-Graham technique. A graph layer capacity is the maximal allowed value for the sum of nodes' widths on a layer of the graph. Typically, a resulting layout using the Coffman-Graham technique is wider than the graph layer capacity. The graph layer capacity has a lower limit which is the maximum of node widths of the graph. The initial value of the upper limit of the graph layer capacity is the sum of the node widths of the graph. A graph layer capacity is sought that produces a layout with an aspect ratio closest to the given or desired aspect ratio. In each step of the binary search loop the present technique calculates the center of the segment between the lower and upper limits as a value for the capacity, and uses this value to compute an interim layout with which is used to compute an aspect ratio that is compared to the given or desired aspect ratio. The loop is stopped when the aspect ratio of the computed layout becomes close enough to the given one, or when the distance between the lower and upper limits becomes too small. This looping process is more specifically described in FIG. 9.

As shown in FIG. 9, box 902, the lower and upper boundaries on the graph layer capacity are initialized, and the center between the upper and lower boundaries is chosen as the initial graph layer capacity. A version of the Coffman-Graham algorithm using these parameters is used to create the layers of an interim layout (box 902). One embodiment of the present layered graph layout technique also applies a node demotion heuristic to this layering computation, as will be discussed in more detail later. Additionally, a properly layered graph for this layering is created (box 906). The present layered graph layout technique then performs node ordering across each layer (box 908) and computes the x-coordinates of the nodes (box 910). A node balancing heuristic may optionally be performed during the ordering step. The aspect ratio of the newly computed layout is then computed (box 912). If the computed layout has an aspect ratio sufficiently close to the desired or given aspect ratio then this layout is used as the layout of the new graph (boxes 914, 922). If the computed layout is not close enough to the desired aspect ratio, new values for the upper and lower boundaries of the graph layer capacity are computed, as is a new value for the graph layer capacity (box 916). If the layout aspect ratio is greater than the desired or given aspect ratio, then the present layered graph technique moves the upper boundary to the center. Otherwise, the lower boundary is moved to the center. This loop is then repeated in this manner until either a layout that produces an aspect ratio close enough to the desired ratio is found or the upper and lower boundaries become too close in which case the last best layout is used to layout the new graph (boxes 904 through 920).

2.5 Details and Alternate Embodiments

The following sections provide details and variations of the layered graph layout technique described above. The following paragraphs are described with respect to FIGS. 8 and 9.

2.5.1 Initialization

As previously discussed, FIG. 8 shows one exemplary embodiment of a process employed in the present layered graph layout technique. As shown in box 802, the input is a graph and a number giving the desired aspect ratio. The output of the process shown in FIG. 8 is a graph layout with the given aspect ratio. If G is a graph, then W(G) can be defined as the width of G, and H(G) can be defined as the height of G after the layout. In these terms the aspect ratio of the graph, denoted by R(G), can be expressed as W(G)/H(G).

Initially the present layered graph layout technique, finds wMin and wMax, such that wMin is equal to the maximum node width and wMax is equal to the sum of the node widths of the graph.

2.5.2 Binary Search and Layout Coffman-Graham

In general, as discussed above, in the core of the present layered graph layout technique lies the Coffman-Graham scheduling algorithm. The Coffman-Graham scheduling algorithm creates a scheduler for a directed acyclic graph of computer jobs for parallel processing on n processors. The number of processors in the Coffman-Graham algorithm for the present layered graph layout technique is replaced by the graph layer capacity.

In the conventional Coffman-Graham scheduler, if there is a directed path in the directed acyclic graph from task t0 to task t1, then to is called a predecessor of t1, and t0 has to be completed before t1 can be begun. If each task takes a unit of time to process on any processor, then a task schedule corresponds to the layering of the DAG, such that tasks scheduled at time 0 form the highest layer, tasks scheduled at time 1 form the layer below it, and so on. A graph layer capacity can play the role of the number of processors in a task scheduling algorithm. This explains how the present layered graph layout technique can use the Coffman-Graham algorithm.

In general, the conventional Coffman-Graham scheme works as follows. First it sorts tasks of the DAG into a list L, where the order of elements in L depends only on the DAG. Then iteratively it assigns tasks at time i. The first unscheduled task from list L, such that all its predecessors are already processed (are scheduled to start before time i), is assigned to a free processor. When there are no more free processors, or there are no more tasks with all predecessors processed, the algorithm switches to scheduling at time i+1.

The present layered graph layout technique employs a modified Coffman-Graham's procedure as follows. For a real number w, representing the graph layer capacity, A(w) is a version of the Coffman-Graham procedure where instead of limiting the number of nodes on a layer it requires that the sum of node widths in a layer is not greater than w. Another distinction of A(w) from the Coffman-Graham algorithm is that the former respects Separation as taught in Sugiyama. That means that for every edge e the time between when the start time of the target of e and the start time of the source of e is at least Separation(e). For example, the following procedure, called B(w) for the purposes of this explanation, applied to a directed acyclic graph G employs the following steps to layout an interim layout. This procedure B(w) to create an interim layout is also based on Sugiyama's scheme of laying out a layered graph:

For an input graph of nodes/vertices and links/edges and other parameters as employed by Sugiyama, the upper and lower limits or boundaries the graph layer capacity and an initial value for the graph layer capacity are initialized (box 902). Let w be the graph layer capacity. The layering step is performed which assigns each node to a layer, a horizontal row using A(w) (where A(w) is a version of the Coffman-Graham procedure where instead of limiting the number of nodes on a layer it requires that the sum of node widths is not greater than w) (FIG. 9, box 904). A proper layered graph is created (along with node demotion if desired) (box 906) by replacing each long edge by a sequence of short, going only one layer down, edges.

2) An ordering step of the vertices/nodes in each layer is then performed (box 908).

3) The x-coordinates of the properly layered graph are calculated (box 910).

This process stops, when the computed aspect ratio is close enough to the given or desired aspect ratio or the distance between wMax and wMin is small (boxes 914, 916, 918, 920 and 922).

2.5.3 Aspect Ratio Computation and Comparison

As discussed previously, once the interim layout of the graph is determined (which includes the width and associated height) an aspect ratio is computed based on this width and height (FIG. 8, box 810). This aspect ratio is compared to the desired aspect ratio, as described previously. More specifically, if R(w) is denoted as the desired aspect ratio, that is the width divided by the height, of the graph bounding box produced by B(w), and it is desirable to create a layout with the aspect ratio r for some positive real number r, a binary search is conducted to find W such that R(W) is close to r. Let CloseR(a) be a boolean predicate returning true when a is close enough to r, where a and b are points on a line. Let CloseW(a, b) be a boolean predicate returning true in the case when the segment [a, b] is small enough to discontinue searching for W inside of it. Let w0 be the maximum of G node widths, and w1 be the sum of all G node widths. Variables w0 and w1 play roles of the lower and the upper boundaries for W correspondingly. Initially, one calculates R(w0) and R(w1) and sets W to w0 if R(w0) is closer to r than R(w1), and sets W to w1 in the opposite case. If R(w0)≧r or R(w1)≦r, then the search is aborted. Otherwise, the following loop is executed:

```
while( not CloseR(R(W)) and not CloseW(w0,w1)){
    w = (w0 + w1)/2;
    run B(w);
    t = R(w);
    if(t is closer to r than R(W)) W = w;
    if(t < r) w0 = w;
    else w1 = w;
}
```

2.5.4 Drawing of Splines

As shown in FIG. 8, box 812, the present layered graph layout technique computes the splines between the vertices/nodes and draws them in to create the final new graph layout. The spline routing procedure does not change the aspect ratio.

2.6 Additional Heuristics

The quality of layouts after applying Coffman-Graham per se usually is not that good, although the new graph layout better utilizes the available space. To improve the new graph layout various heuristics may be applied. These heuristics may include node demotion and balancing of virtual and original nodes during the adjacent swap process, which are discussed in more detail in the following section. Additionally, the width and height of the new graph can be adjusted so that the computed aspect ratio of the new graph more precisely matches the desired aspect ratio.

2.6.1 Balancing Virtual and Original Nodes.

Figure 10:
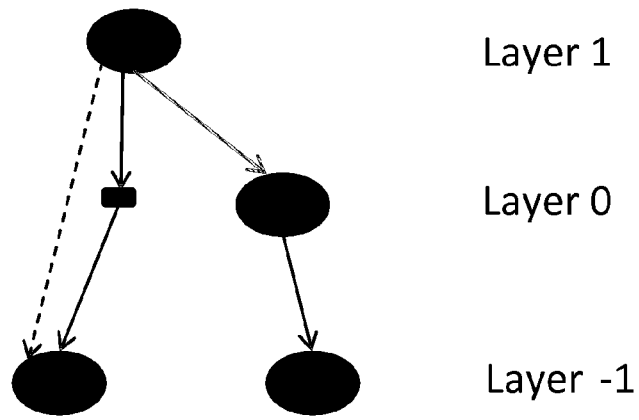
FIG. 10 depicts the dashed original edge of a directed acyclic graph being replaced by two short edges and a virtual vertex.

When a proper layered graph is created, which happens after the layering step, all original graph edges spanning more than one layer are replaced by edges spanning exactly one layer. At this step virtual vertices are introduced. As shown in FIG. 10, the dashed original edge is replaced by two short edges and a virtual vertex. As discussed previously, the balancing of virtual and original nodes occurs in the ordering step of the Sugiyama's scheme algorithm. During this step vertices are already assigned to the layers but their order is not fixed. The vertices are permuted inside of the layers to reduce edge crossing.

For example, consider a layer that consists of virtual and original vertices. Without loss of generality, it can be assumed that the number of virtual vertices in the layer is not greater than the number of the original ones in the layer. The virtual vertices in this case are called separation vertices, and original vertices as are referred to as regular ones. Ideally, each separation vertex is surrounded on the left and the right by an equal number of regular vertices. Swapping two adjacent vertices of the layer is considered. The swap is allowed if it decreases the number of edge crossings, and disallowed when it increases the number of edge crossings. However, if the number of edge crossings does not change as a result of the swap, the swap is allowed if it reduces the difference between the numbers of elements of the left and the right groups of the regular vertices for some separation vertex involved in the swap.

Figure 11:
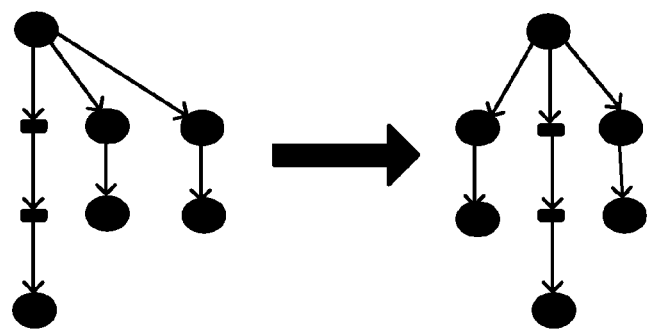
FIG. 11 depicts the effect of applying a node balancing heuristic to a graph laid out by the present layered graph layout technique.

The effect of applying the balancing heuristic is illustrated by FIG. 11. It can be seen that the layout of the graph on the right hand side of FIG. 11 is more aesthetically pleasing because it is balanced. The balancing is not a separate step but rather a part of the stage where vertices adjacent on the same layer are swapped. The swapping of adjacent vertices is done to reduce the number of edge crossings. Here it is also utilized for the purpose of spreading evenly virtual and original nodes. The changes to the swapping process can be described as follows. Suppose one has a layer with sets of nodes which are the union of the set of virtual nodes and the set of original nodes. A set is chosen from the last two sets with a minimal number of elements, and elements of this set are called separators. Nodes from the other set are called nulls. In one embodiment, the present layered graph layout technique always swaps two vertices if it reduces the number of edge crossings, and never swaps vertices when it increases the number of edge crossings. In the case when the number of edge crossings does not change as a result of the swap the following heuristic can be applied. Consider swapping of a separator s with a null m, where m is one of the non-separators of the sets discussed above. Let K(M) be the set of all null nodes z to the left (or right) of s such that there is no separator different from s positioned between z and s. Let K' and M' be sets defined the same way but as if s and m are swapped. If $\|K'|-|M'\| < \|K|-|M\|$ then the present layered graph layout technique proceeds with the swap. The intuition is that the swap in this case improves the balance between nulls to the left and to the right from s.

2.6.2 Demoting or Pulling Down Nodes to Shorten the Edges

As discussed previously, in node demotion each vertex of such a graph is assigned to a layer, the graph is a DAG, and every graph's edge goes at least one layer down. If l is the function mapping vertices to layers, then the last condition can be expressed as $l(u) > l(v)$ for every edge $(u,v)$ of the graph.

When a processor is available and there is a task which is ready to be executed, the Coffman-Graham algorithm immediately assigns the task to the processor. The present technique may improve the resulting layout by scheduling some tasks to a later time, or, in the layering terms, by pulling nodes down, or demoting them, as shown in FIG. 9, box 906 when computing the proper layered graph. This procedure tries diminishing the sum $$\sum_{(u,v) \in G} Weight(u, v)(1[u] - 1[v]) \qquad (2)$$

where l is the layering function. The demotion step that is executed is just a promotion step being run in the opposite direction.

One can see that it is beneficial to demote nodes with outgoing edges having more Weight than incoming ones. However, when a node is demoted, the layering can become infeasible, that is, a node may now have a successor on a layer, which is not allowed by the function Separation. To restore the feasibility of the layering the present layered graph layout technique demotes all such successors of the node. A recursive procedure evaluating if the node demotion is beneficial can be employed for this purpose. While executing the demotion step, it is desirable that for each layer the sum of its node widths remains not greater than the graph layer capacity, and that the total number of layers does not grow. The demotion procedure is stopped when there are no more nodes for which it is beneficial.

Figure 12:
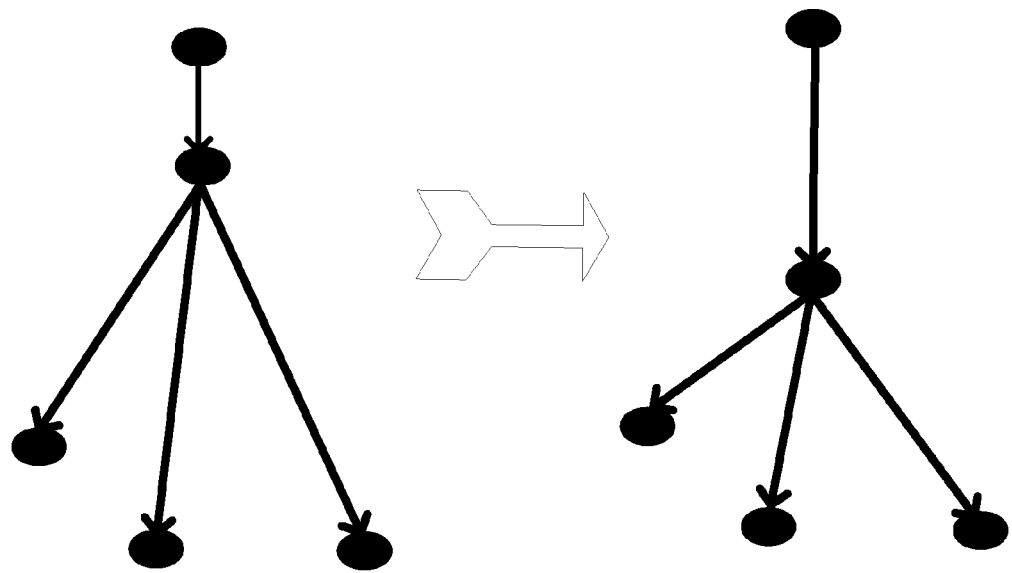
FIG. 12 shows the improvement to a graph layout made by pulling down vertices to shorten the edges.

FIG. 12 shows the improvement made when pulling down the vertices to shorten the edges.

2.6.3 Adjustment of Graph to Precise Aspect Ratio

As discussed previously, and shown in FIG. 8, box 810, after the binary search the present layered graph layout technique produces a layout with the aspect ratio that is rather close to the given one, but is not necessarily equal to it. The technique may make a final adjustment to the computed graph layout by enlarging distances between the nodes in the horizontal or vertical directions, thus achieving the precise aspect ratio.

It should be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for laying out a layered graph, comprising using a computer to perform the process actions of:

inputting a directed graph and a desired aspect ratio;

creating a directed acyclic graph from the input directed graph;

determining a layout of a new graph by using a process that limits the widths of nodes in a layer of the directed acyclic graph to find an interim layout of the directed acyclic graph with an aspect ratio that matches the desired aspect ratio wherein determining the interim layout of the new directed acyclic graph using the process comprises:

(a) defining a layout function that uses a graph layer capacity, wherein the graph layer capacity is the maximum of the sum of the node widths on a layer;

(b) computing layers of the new directed acyclic graph using the defined layout function by assigning nodes to a layer where the sum of the node widths assigned to a layer cannot be greater than the graph layer capacity, and the sum of the node widths assigned to a layer cannot be less than a minimum layer width;

(c) replacing any long edge between nodes of the new directed acyclic graph by a sequence of short edges which span only one layer each;

(d) ordering the layers of the new directed acyclic graph; and (e) calculating the coordinates of the nodes of the new directed acyclic graph to create the interim layout;

if the aspect ratio of the interim layout of the acyclic graph does not match the desired aspect ratio, repeating (a) through (e) using a new graph layer capacity and minimum layer width; and performing a layout of the new graph with the interim layout of the directed acyclic graph when an interim layout is found such that its aspect ratio matches the desired aspect ratio.

2. The computer implemented process of claim 1 further comprising stretching the new graph in the horizontal and vertical directions to obtain an aspect ratio that exactly matches the desired aspect ratio.

3. The computer-implemented process of claim 2 wherein the height and width of the new graph are adjusted by adjusting the horizontal and vertical distances between the nodes.

4. The computer-implemented process of claim 1 further comprising computing splines connecting nodes in the new graph.

5. The computer-implemented process of claim 4 further comprising drawing splines between the nodes of the new graph.

6. The computer-implemented process of claim 1 wherein determining a layout of a new graph further comprises balancing the nodes of the layout of the new graph in the horizontal direction.

7. The computer-implemented process of claim 1 further comprising shortening the lengths of the edges in the new graph.

8. The computer-implemented process of claim 1 wherein the input graph is defined by a separation function, a weight function, nodes and node boundary curves.

9. A system for generating a layout for a directed acyclic graph, comprising:

a general purpose computing device;

a computer program comprising program modules executable by the general purpose computing device, wherein the computing device is directed by the program modules of the computer program to, (a) input a given directed graph and a desired aspect ratio;

(b) determine the minimum and maximum widths of a desired new directed acyclic graph;

(c) use the minimum and maximum widths to find a width of the new directed acyclic graph;

(d) determine an interim layout of the new directed acyclic graph using a procedure with a graph layer capacity, wherein the graph layer capacity is the maximum of the sum of the node widths on a layer, and wherein the procedure comprises:

defining a layout function that uses the graph layer capacity;

computing layers of the new directed acyclic graph using the defined layout function by assigning nodes to a layer where the sum of the node widths assigned to a layer cannot be greater than the graph layer capacity, and the sum of the node widths assigned to a layer cannot be less than a minimum layer width;

replacing any long edge between nodes of the new directed acyclic graph by a sequence of short edges which span only one layer each;

ordering the layers of the new directed acyclic graph;

calculating the coordinates of the nodes of the new directed acyclic graph to create the interim layout;

(e) compute an aspect ratio using the height and width of the interim layout of the new directed acyclic graph;

(f) compare the computed aspect ratio to the desired aspect ratio;

(g) if the computed aspect ratio is close enough to the desired aspect ratio, or the maximum and minimum widths are too close, output the new directed acyclic graph with the interim layout; and (h) if the computed aspect ratio is not close enough to the desired aspect ratio, compute a new width and repeat (b) through (h) until the computed aspect ratio is close enough to the desired aspect ratio.

10. The system of claim 9 further comprising a module to draw splines between the nodes in the new directed acyclic graph.

11. The system of claim 9 wherein a binary search is used to find the width of the new directed acyclic graph.

12. The system of claim 9 further comprising a module for adjusting the overall height and width of the new directed acyclic graph so that it precisely matches the given aspect ratio.

13. A computer-implemented process for laying out a directed acyclic graph, comprising using a computer to perform the process actions of:

(a) inputting a desired aspect ratio of a graph and directed acyclic graph comprising nodes and edges, a separation function, a weight function and node boundaries;

(b) initializing the lower and upper boundaries on the graph layer capacity;

(c) using the lower and upper boundaries to determine an interim capacity for the new layout;

(d) computing the layers for the new layout process using the graph layer capacity, wherein the graph layer capacity is the maximum of the sum of the node widths on a layer, by assigning nodes to a layer where the sum of the node widths assigned to a layer cannot be greater than the graph layer capacity, and the sum of the node widths assigned to a layer cannot be less than a minimum layer width;

(e) creating a properly layered graph using the new layout by replacing any long edge between nodes by a sequence of short edges that span only on layer each;

(f) ordering layers of the properly layered graph;

(g) calculating the x-coordinates of the nodes in the properly layered graph;

(f) computing an aspect ratio of the new layout in the properly layered graph format;

(g) comparing the computed aspect ratio to the desired aspect ratio; and (h) if the computed aspect ratio is close enough to the desired aspect ratio, using the new layout as the layout of the new directed acyclic graph; and (i) if the computed aspect ratio is not close enough to the desired aspect ratio, or the upper and lower boundaries are too close to each other, computing new upper and lower boundaries and a new width of the desired directed acyclic graph, and repeating (d) through (i).

14. The computer-implemented process of claim 13 further comprising balancing nodes of the properly layered graph so that they are visually pleasing.

15. The computer-implemented process of claim 14 further comprising shortening lengths of the edges between the nodes of the new directed acyclic graph.

16. The computer-implemented process of claim 13 further comprising adjusting the overall height and width of the new graph so that it more precisely matches the given aspect ratio in the aspect ratio adjustment module.

17. The computer-implemented process of claim 13 further comprising drawing splines between the nodes of the new graph.

\* \* \* \* \*